(12) United States Patent
Xu et al.

(10) Patent No.: US 10,880,547 B2
(45) Date of Patent: *Dec. 29, 2020

(54) METHOD OF ADAPTIVE MOTION VECTOR RESOLUTION FOR VIDEO CODING

(71) Applicant: HFI Innovation Inc., Zhubei (TW)

(72) Inventors: Xiaozhong Xu, Fremont, CA (US); Kai Zhang, Beijing (CN); Shan Liu, San Jose, CA (US); Jicheng An, Beijing (CN); Xianguo Zhang, Beijing (CN)

(73) Assignee: HFI INNOVATION INC., Zhubei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/564,042

(22) Filed: Sep. 9, 2019

(65) Prior Publication Data

US 2020/0007863 A1     Jan. 2, 2020

Related U.S. Application Data

(63) Continuation of application No. 15/514,129, filed as application No. PCT/CN2015/091275 on Sep. 30, 2015, now Pat. No. 10,455,231.

(30) Foreign Application Priority Data

Sep. 30, 2014 (WO) ................ PCT/CN2014/088017
Jan. 26, 2015 (WO) ................ PCT/CN2015/071553
Feb. 3, 2015 (WO) ................ PCT/CN2015/072175

(51) Int. Cl.
*H04N 19/117* (2014.01)
*H04N 19/52* (2014.01)
(Continued)

(52) U.S. Cl.
CPC ......... *H04N 19/117* (2014.11); *H04N 19/124* (2014.11); *H04N 19/139* (2014.11);
(Continued)

(58) Field of Classification Search
USPC ...................................................... 375/240.16
See application file for complete search history.

(56) References Cited

U.S. PATENT DOCUMENTS

| 8,111,325 B2 | 2/2012 | Kondo et al. |
| 9,237,355 B2 | 1/2016 | Chien et al. |

(Continued)

FOREIGN PATENT DOCUMENTS

| CA | 2852533 A1 | 5/2013 |
| CN | 101039406 A | 9/2007 |

(Continued)

OTHER PUBLICATIONS

Lim, S.C., et al.; "Dynamic range restriction of temporal motion vector," Joint Collaborative Team on Video Coding (JCT-VC) of ITU-T SG16 WP3 and ISO/IEC JTC1/SC29/WG11; Mar. 2011; pp. 1-7.

(Continued)

*Primary Examiner* — Behrooz M Senfi
(74) *Attorney, Agent, or Firm* — McClure, Qualey & Rodack, LLP

(57) ABSTRACT

A method of MVP (motion vector prediction) for video coding with adaptive motion vector resolution is disclosed. According to the present invention, the MVP coding is applied to the current MV or the current MV is stored depending on the current MV resolution, the reference MV resolution, or both the current MV resolution and the reference MV resolution. In one embodiment, when the current MV resolution corresponds to integer pixel resolution, MVP coding is then applied to the current MV using a modified (Continued)

temporal MV as a motion vector predictor for the current MV, where the modified temporal MV is generated by right-shifting the temporal MV. In another embodiment, when the current MV resolution corresponds to integer pixel resolution, the current MV is left-shifted before it is stored in a memory.

11 Claims, 4 Drawing Sheets

Related U.S. Application Data

(60) Provisional application No. 62/182,685, filed on Jun. 22, 2015, provisional application No. 62/154,373, filed on Apr. 29, 2015.

(51) Int. Cl.
*H04N 19/139* (2014.01)
*H04N 19/176* (2014.01)
*H04N 19/523* (2014.01)
*H04N 19/124* (2014.01)
*H04N 19/86* (2014.01)

(52) U.S. Cl.
CPC ........... *H04N 19/176* (2014.11); *H04N 19/52* (2014.11); *H04N 19/523* (2014.11); *H04N 19/86* (2014.11)

(56) References Cited

U.S. PATENT DOCUMENTS

| | | | |
|---|---|---|---|
| 10,075,712 B2 * | 9/2018 | Liu | H04N 19/577 |
| 10,455,231 B2 * | 10/2019 | Xu | H04N 19/176 |
| 2002/0196853 A1 | 12/2002 | Liang et al. | |
| 2005/0259730 A1 | 11/2005 | Sun | |
| 2010/0246681 A1 | 9/2010 | Wang et al. | |
| 2010/0322316 A1 | 12/2010 | Yoshino et al. | |
| 2011/0274161 A1 | 11/2011 | Park et al. | |
| 2013/0271566 A1 | 10/2013 | Chen et al. | |
| 2013/0294522 A1 | 11/2013 | Lim et al. | |
| 2015/0085929 A1 | 3/2015 | Chen et al. | |
| 2015/0085935 A1 | 3/2015 | Chen et al. | |
| 2015/0195562 A1 | 7/2015 | Li et al. | |
| 2015/0271487 A1 | 9/2015 | Li et al. | |
| 2016/0057420 A1 | 2/2016 | Pang et al. | |
| 2016/0173889 A1 | 6/2016 | Lee et al. | |
| 2016/0337662 A1 | 11/2016 | Pang et al. | |
| 2017/0289566 A1 | 10/2017 | He et al. | |

FOREIGN PATENT DOCUMENTS

| | | |
|---|---|---|
| CN | 102647594 A | 8/2012 |
| CN | 102783149 A | 11/2012 |
| CN | 103188496 A | 7/2013 |
| WO | WO 2013/155267 A2 | 10/2013 |
| WO | 2015105816 A1 | 7/2015 |
| WO | 2016/029144 A1 | 2/2016 |

OTHER PUBLICATIONS

International Search Report dated Jan. 6, 2016, issued in application No. PCT/CN2015/091275.

Sullivan, G.J., et al.; "Overview of the High Efficiency Video Coding (HEVC) Standard;" IEEE Transactions on Circuits and Systems for Video Technology; vol. 22; No. 12; Dec. 2012; pp. 1649-1668.

* cited by examiner

METHOD OF ADAPTIVE MOTION VECTOR RESOLUTION FOR VIDEO CODING

CROSS REFERENCE TO RELATED APPLICATIONS

The present application is a continuation of application Ser. No. 15/514,129, filed Mar. 24, 2017, now U.S. Pat. No. 10,455,231, which is a national stage application of PCT Patent Application PCT/CN2015/091275, filed Sep. 30, 2015, which claims priority to PCT Patent Application, Serial No. PCT/CN2014/088017, filed on Sep. 30, 2014, PCT Patent Application, Serial No. PCT/CN2015/071553, filed on Jan. 26, 2015, PCT Patent Application, Serial No. PCT/CN2015/072175, filed on Feb. 3, 2015. Further, PCT/CN2015/091275 claims priority to U.S. Provisional Patent Application, Ser. No. 62/154,373, filed on Apr. 29, 2015, and U.S. Provisional Patent Application, Ser. No. 62/182,685, filed on Jun. 22, 2015. The PCT Patent Applications and the U.S. Provisional Patent Applications are hereby incorporated by reference in their entireties.

TECHNICAL FIELD

The present invention relates to adaptive motion vector resolution in video coding. In particular, the present invention relates to applying motion vector prediction depending on the current motion vector resolution, the reference motion vector resolution or both.

BACKGROUND

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition. Several coding tools for screen content coding have been developed.

Unlike regular live video contents, video materials corresponding to screen contents often have integer displacement values. Therefore, conventional encoders normally interpret motion vectors in bitstreams as fractional pixel offsets, such as ¼ may unnecessarily increase the bitrate. On the other hand, fractional motion vector values are still very useful for contents corresponding to natural scenes such as camera-captured contents. Accordingly, adaptive motion vector resolution targeted to address the issue of different video contents has been described in JCTVC-S0085 (Li, et al., "*Adaptive motion vector resolution for screen content*", Joint Collaborative Team on Video Coding (JCT-VC) of ITU-T SG16 WP3 and ISO/IEC JTC1/SC29/WG11 19th Meeting: Strasbourg, FR, 17-24 Oct. 2014, Document: JCTVC-S0085).

According to JCTVC-S0085, an adaptive MB resolution enable flag (i.e., adaptive_mv_resolution_enabled_flag) is signaled in SPS (sequence parameter set) to indicate whether adaptive motion vector resolution is applied as shown in Table 1. In the slice header, an integer MV flag (i.e., use_integer_mv_flag) is signaled (see note (1-2) in Table 1) to indicate whether a motion vector (MV) in the current slice uses integer pixel resolution (i.e., use_integer_mv_flag=1) or quarter pixel resolution (i.e., use_integer_mv_flag=0). As shown in Table 1, syntax element, use_integer_mv_flag is incorporated in the bitstream only when adaptive MV resolution is enabled as indicated by the-SPS level syntax element, adaptive_mv_resolution_enabled_flag (see note (1-1) in Table 1).

TABLE 1

| | Note |
|---|---|
| slice_segment_header( ) { | |
| ..... | |
| if( adaptive_mv_resolution_enabled_flag ) | (1-1) |
| use_integer_mv_flag | (1-2) |
| .... | |
| } | |

At the decoder side, MV is parsed and decoded in the same way regardless whether use_integer_mv_flag is 0 or 1 in the current slice. Before the interpolating process, MV is scaled based on use_integer_mv_flag as shown below according to JCTVC-S1005 (Joshi, et al., "*High Efficiency Video Coding (HEVC) Screen Content Coding: Draft 2*", Joint Collaborative Team on Video Coding (JCT-VC) of ITU-T SG16 WP3 and ISO/IEC JTC1/SC29/WG11 19th Meeting: Strasbourg, FR, 17-24 Oct. 2014, Document: JCTVC-S1005).

$$\text{if use\_integer\_mv\_flag}==1, \text{ then } mvLX<<=2, mvCLX<<=2. \quad (1)$$

In equation (1), X is equal to 0 or 1, mvLX represents the motion vector of the luma component associated with list LX (i.e, list L0 or L1), and mvcLX represents the motion vector of the chroma component associated with list LX (i.e, list L0 or L1). The operation " "mvLX<<2" means that mvLX is left-shifted by 2 and the result replaces the original mvLX. Similarly, the operation " "mvcLX<<2" means that mvLX is left-shifted by 2 and the result replaces the original mvcLX.

There are several problems in the current slice level MV adaptive resolution approach. First, when temporal motion vector prediction (TMVP) is applied and the use_integer_mv_flag in the collocated picture and in the current picture are different, the MV resolution of the motion vector predictor (MVP) and the MV in the current picture being predicted will be mismatched. In this disclosure, abbreviation MVP may also correspond to either motion vector prediction or motion vector predictor depending on the usage context.

FIG. 1 shows an example. In this scenario, use_integer_mv_flag in the current picture (110) is 0, use_integer_mv_flag in the collocated picture (120) is 1, and the collocated MV (124) is equal to (4, 4) for the reference block (122). According to the existing practice, the collocated MV (4,4) will be treated as a MVP for the current MV (114) of the current block (112) of the current picture (110) directly if TMVP is used. However, the collocated MV (4,4) in the collocated picture represents a motion vector value of (16, 16) when MV is expressed in the quarter-pixel resolution.

In another scenario, use_integer_mv_flag in the current picture is 1, use_integer_mv_flag in the collocated picture is 0, and the collocated MV is still equal to (4, 4). According to the existing practice, the collocated MV (4,4) will be treated as a MVP for the current picture directly if TMVP is used. However, the collocated MV (4,4) in the collocated picture represents a motion vector value of (1, 1) when the MV is expressed in the integer pixel resolution.

In both examples shown above, the resolution of the MVP does not match with the resolution of the current MV to be predicted. This will deteriorate the efficiency of TMVP.

Another problem arises due to the bit width limitation. According to JCTVC-S1005, the resulting values of mvL0 and mvL1 as specified above will always be in the range of $-2^{15}$ to $2^{15}-1$, inclusive. With this limitation, it is guaranteed that mvL0 and mvL1 can be expressed in two bytes. However, under the condition that use_integer_mv_flag in the current picture is 1, use_integer_mv_flag in the collocated picture is 0 and the collocated MV is equal to $(2^{15}-1, 2^{15}-1)$, mvLX will exceed the two byte limitation after the mvLX<<=2 and mycLX<<=2 operation if TMVP merging candidate is selected.

The adaptive MV resolution may also cause an issue in the deblocking process when MVs in the current slice have integer pixel resolution. In the deblocking process, boundary strength is determined to select corresponding deblocking filter for a block boundary. The boundary strength is determined according to various factors. Among the different factors, one factor is related to the motion vectors on both sides of a block boundary. In particular, |Q_MVx−P_MVx| and |Q_MVy−P_MVy| is compared to a threshold value of 4 to determine the filtering boundary strength, where Q_MV and P_MV represents motion vectors in two adjacent blocks, Q_MVx and Q_MVy represent the x and y components of Q_MV, and P_MVx and P_MVy represent the x and y components of P_MV.

The threshold value of 4 is designed with the assumption that MVs always use quarter-pixel resolution. However, when MVs in the current slice uses other MV resolution such as integer pixel resolution, the threshold value of 4 may not be appropriate.

IntraBC (Intra picture block copy) is another coding tool for HEVC screen content coding (HEVC-SCC) extension. For the coding units (CUs) using IntraBC mode, the prediction block is obtained from the reconstructed region of current frame. Then, the block vectors (BVs) and residual are coded. In the 20th JCT-VC meeting in Geneva, February 2015, it was agreed that the IntraBC is unified with Inter coding mode. That is, the current picture is treated as a reference picture and inserted into one or both reference picture lists. Block vector prediction and coding are the same as inter motion vector prediction and coding. This unification simplifies the codec design. However there are some remaining issues. For example, in current SCM the block vectors are always using integer resolution while motion vectors can be both integer resolution and quarter-pel resolution, switched at slice level. This may lead to a resolution mismatch during the deblocking stage and MV prediction stage.

In HEVC screen content coding (HEVC-SCC) extension, another coding tool, named adaptive color-space transform or in-loop color-space transform has been adopted. An example of decoding flow for the in-loop color-space transform is shown in FIG. 2. An additional module, i.e., inverse color-space transform (230) is included. Various modules are shown in FIG. 2 including entropy decoder (210), de-quantization (215), inverse transform (220), cross-component prediction (CCP, 225), motion compensation (235), Intra prediction (240), adder (245), deblocking filter (250), SAO (sample adaptive offset) filter (255) and DPB (decoded picture buffer, 260). The decoder also includes a first switch (S1) select inverse color-space transform (in the lower position) or bypass the inverse color-space transform (in the upper position). The decoder also includes a second switch (S2) select Inter prediction (in the upper position) or Intra prediction (in the lower position). Other than the inverse color-space transform (230), all other modules are standard decoder modules used in conventional HEVC. When a block is coded with the color-space transform enabled, the inverse color-space transform is invoked to convert the residual domain back to the original domain for the output from the conventional inverse DCT/DST transform and CCP. A flag is signaled to indicate the usage of color-space transform in a CU. For IntraBC (Intra picture block copy) and Inter modes, the flag is signaled only when there is at least one non-zero coefficient in the current CU. For Intra modes, the flag is signaled only when the chroma mode of the first PU (i.e., top-left PU within the CU) is coded with DM mode. DM mode corresponds to direct mode where Intra mode for the chroma component is the same as the Intra mode used for the luma component.

Two different color-space transforms are applied depending on whether the CU is coded in a lossless or lossy manner. The forward and the inverse color-space transforms for lossy coding use the YCoCg transform matrices, which are defined as follows:

$$\text{Forward: } \begin{bmatrix} C'_0 \\ C'_1 \\ C'_2 \end{bmatrix} = \begin{bmatrix} 1 & 2 & 1 \\ 2 & 0 & -2 \\ -1 & 2 & -1 \end{bmatrix} \begin{bmatrix} C_0 \\ C_1 \\ C_2 \end{bmatrix} / 4, \text{ and} \quad (2)$$

$$\text{Inverse: } \begin{bmatrix} C_0 \\ C_1 \\ C_2 \end{bmatrix} = \begin{bmatrix} 1 & 1 & -1 \\ 1 & 0 & 1 \\ 1 & -1 & -1 \end{bmatrix} \begin{bmatrix} C'_0 \\ C'_1 \\ C'_2 \end{bmatrix}, \quad (3)$$

wherein the original color space $(C_0, C_1, C_2)$ may correspond to (R, G, B), (Y, Cb, Cr) or (Y, U, V).

The forward color-space transform in lossy coding as shown in equation (2) is not normalized, which results in reduced signal when the transform is applied. Considering that the norm of the forward transform is roughly equal to $\sqrt{6}/4$ for $C_0$ and $C_2$, and $\sqrt{2}/2$ for $C_1$, delta QPs (quantization parameters) of (−5, −3, −5) are used to compensate the reduced signal range for the three color components, respectively. In other words, when the color-space transform is applied, the quantization parameter is set to (QP−5, QP−3, QP−5) for the three components, respectively, where QP is the 'normal' QP value for the CU without the color-space transform. The QP adjustment to accommodate the signal range reduction color-space transform is performed for the quantization/de-quantization process. On the other hand, while the deblocking process also utilizes the QP values, only the normal QP values are used for the deblocking process.

In the specification of HEVC-SCC, the QP is adjusted as described in sub-clause 8.6.2. The quantization parameter qP is derived as follows:

If cIdx is equal to 0, qP=Qp'Y+(cu_residual_act_flag[*xTbY*][*yTbY*]?−5:0)  (4)

Otherwise, if cIdx is equal to 1, qP=Qp'Cb+(cu_residual_act_flag[*xTbY*][*yTbY*]?−5:0)  (5)

Otherwise (cIdx is equal to 2), qP=Qp'Cr+(cu_residual_act_flag[*xTbY*][*yTbY*]?−3:0)  (6)

where cu_residual_act_flag[xTbY][yTbY] is 1 if adaptive color-space transform is applied in the block with left-top position (xTbY, yTbY). Otherwise, cu_residual_act_flag [xTbY][yTbY] is 0. Qp'Y, Qp'Cb and Qp'Cr correspond to original quantization parameters for color component Y, Cb and Cr respectively. The expression (cu_residual_act_flag [xTbY][yTbY]?−5:0) will return a value (−5) if cu_residual_act_flag[xTbY][yTbY] is true or equal to 1, and will return 0 if cu_residual_act_flag[xTbY][yTbY] is false or equal to 0. The variable cIdx mentioned above corresponds to color index.

However, the scaling process controlled by QP is defined in sub-clause 8.6.3 of the HEVC standard according to:

$$d[x][y]=\text{Clip3}(\text{coeffMin},\text{coeffMax},((\text{TransCoeffLevel}\\ [xTbY][yTbY][cIdx][x][y]*m[x][y]*\text{levelScale}[qP\\ \%6]<<(qP/6))+(1<<(\text{bdShift}-1)))>>\text{bdShift}). \quad (7)$$

For k=0.5, the list levelScale[ ] is specified as levelScale [k]={40, 45, 51, 57, 64, 72}.

The qP adjustment in equations (4), (5) and (6) may cause a qP to be less than 0 when the adaptive color-space transform is applied. When qP<0, "qP %6" will result in a negative argument for the list levelScale[ ] and lead to an undefined levelScale[ ] value. Therefore, d[x][y] is undefined in equation (7). Therefore, it is desirable to overcome this issue.

SUMMARY

A method of MVP (motion vector prediction) for video coding with adaptive motion vector resolution is disclosed. According to the present invention, the MVP coding is applied to the current MV or the current MV is stored depending on the current MV resolution, the reference MV resolution, or both the current MV resolution and the reference MV resolution. In one embodiment, the reference MV associated with the reference block in the reference picture corresponds to a temporal MV associated with a temporal reference block in the reference picture. In another embodiment, when the current MV resolution corresponds to integer pixel resolution, TMVP coding is applied to the current MV using a modified temporal MV as a motion vector predictor for the current MV, where the modified temporal MV is generated by right-shifting the temporal MV. An offset may be added to the temporal MV before the temporal MV is right-shifted to generate the modified temporal MV. In another embodiment, when the current MV resolution corresponds to integer pixel resolution, the current MV is left-shifted before it is stored in a memory. The shifted current MV can be used for the TMVP coding of a subsequent MV. The shifted current MV is shifted back before it is used as a motion vector predictor for another block in a current picture containing the current slice. Alternatively, a syntax element related to the current MV resolution can be stored in a memory for the TMVP coding of a subsequent MV.

When the current MV resolution corresponds to integer pixel resolution and the reference MV resolution corresponds to non-integer pixel resolution, the TMVP coding can be applied to the current MV using a modified temporal MV as a motion vector predictor for the current MV, where the modified temporal MV is generated by right-shifting the temporal MV. In another case, when the current MV resolution corresponds to non-integer pixel resolution and the reference MV resolution corresponds to integer pixel resolution, the TMVP coding can be applied to the current MV using a modified temporal MV as a motion vector predictor for the current MV, where the modified temporal MV is generated by left-shifting the temporal MV. When the current MV resolution is different from the reference MV resolution, the TMVP coding may also be disabled for the current MV or the encoder may disregard the reference picture for the TMVP coding of the current block.

In another embodiment, when a shift operation is applied to the current MV or the temporal MV due to the current MV resolution or the reference MV resolution respectively, the current MV shifted or the temporal MV shifted is clipped to a valid range. Alternatively, the current MV may have different ranges for different current MV resolutions or the temporal MV may have different ranges for different reference MV resolutions.

A first syntax element indicating the current MV resolution and a second syntax element indicating the reference MV resolution can be determined by an encoder to cause the current MV resolution has a same value as the reference MV resolution. The current MV resolution may also indicated by a MV resolution flag in a slice header and all blocks within a corresponding slice share the MV resolution flag, and the MV resolution flag has a same value for all slices in a sequence. Alternatively, the current MV resolution can be indicated by a MV resolution flag in a sequence level and all blocks within a corresponding sequence share the MV resolution flag. Therefore, MV resolution for a current MV and a temporal reference MV will always be the same.

Another aspect of the present invention addresses the issue associated with boundary strength derivation when adaptive MV resolution is used. In one embodiment, the block boundary is deblocked depending on the MV resolution. For example, when the MV resolution corresponds to integer resolution, the current MV and the neighboring MV are left-shifted by 2 to become a shifted current MV and a shifted neighboring MV, and the shifted current MV and the shifted neighboring MV are included in determination of boundary strength used for said deblocking. In another example, when the MV resolution corresponds to half-pixel resolution, the current MV and the neighboring MV are left-shifted by 1. In a further example, when the MV resolution corresponds to one-eighth-pixel resolution, the current MV and the neighboring MV are right-shifted by one.

In another embodiment, when the MV resolution corresponds to integer resolution, a first absolution difference in a vertical component between the between the current MV and the neighboring MV and a second absolution difference in a horizontal component between the between the current MV are compared to a threshold value of 1 instead of 4 to determine boundary strength used for said deblocking. In another example, when the MV resolution corresponds to half-pixel resolution, the first absolution difference in a vertical component and the second absolution difference in a horizontal component are compared to a threshold value of 2 instead of 4. In yet another example, when the MV resolution corresponds to one-eighth-pixel resolution, the first absolution difference in a vertical component and the second absolution difference in a horizontal component are compared to a threshold value of 8 instead of 4.

Another aspect of the present invention addresses the issue associated with quantization parameter adjustment to accommodate signal range reduction when color-space transform is applied. In one embodiment, a valid adjusted qPs (quantization parameters) is generated from the qPs by modifying the qPs to adjusted qPs to account for the color-space transform and setting the adjusted qPs to equal to or greater than zero if the adjusted qPs are smaller than zero. For example, the multiple video components correspond to YCrCb color components, the valid adjusted quantization parameter qPX' for one color component according to qPX'=Max(zero, qPX-nX) if the color-space-transform-flag indicates that the color-space transform is applied to the current coding block and qPX'=Max(zero, qPX) if the color-space-transform-flag indicates that the color-space transform is not applied to the current coding block. Variable nX is 5 for Y component and Cb component and nX is 3 for Cr component and Max( ) is a maximum function. A valid adjusted qPs can also be generated using a clipping function. For example, when the color-space transform is applied, (qPX-$n_x$) is clipped to a range from MinQPX to MaxQPX, where MinQPX and MaxQPX correspond to a valid minimum quantization parameter and to a valid maximum quantization parameter for one color component respectively. MinQPX can be zero and MaxQPX can be fivety-one for the Y component, the Cb component and Cr component. In another embodiment, qPX' is generated from qPX according to a function of qPX if the color-space transform is applied to the current coding block, where the function of qPX is always greater than or equal to zero.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

As mentioned previously, when adaptive MV (motion vector) resolution is used and if the current MV and an corresponding TMVP (temporal motion vector prediction) has different MV resolutions, it will cause a mismatch between the two MVs. Accordingly, the TMVP operation may not performly correctly. In order to regularize MVs when adaptive MV resolution is applied, several methods are proposed.

Figure 1:
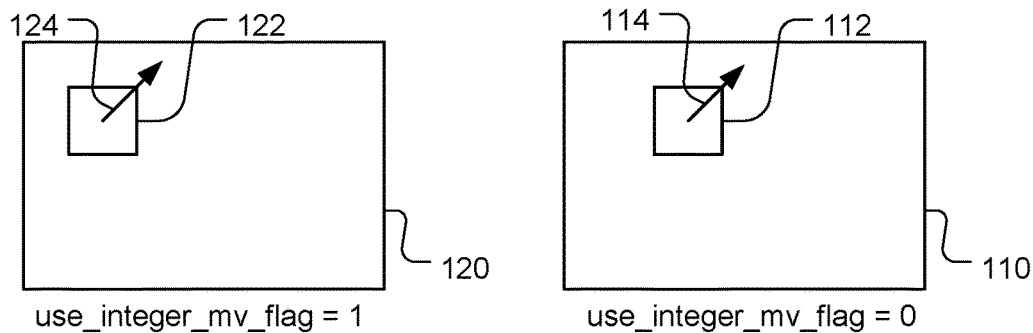
FIG. 1 illustrates an example of TMVP (temporal motion vector prediction) for a current MV (motion vector) under the condition of different MV resolution between the current MV and the TMVP.
Figure 2:
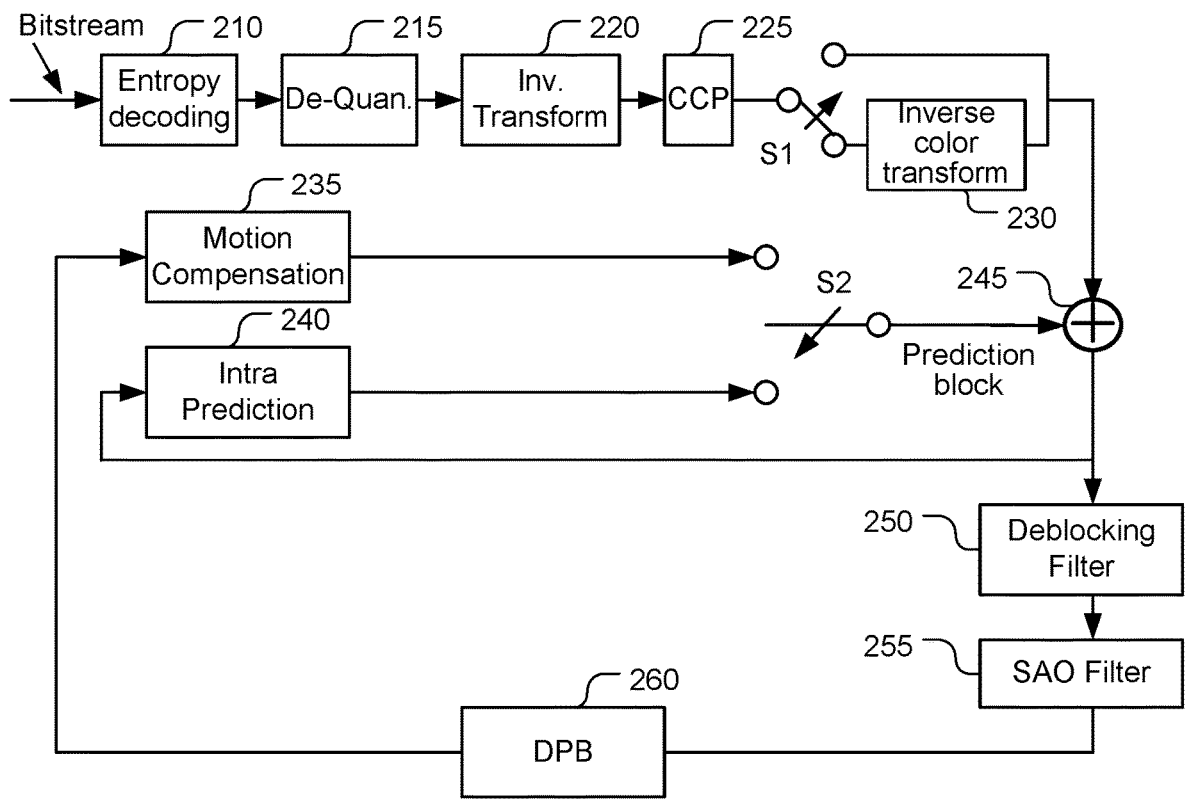
FIG. 2 illustrates a block diagram of a decoding system incorporating in-loop color-space transform.
Figure 3:
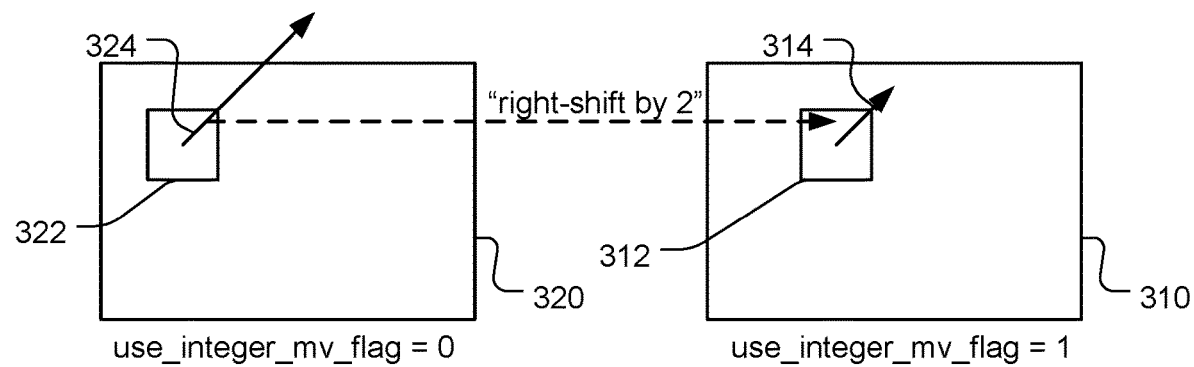
FIG. 3 illustrates an example of scaling the TMVP when use_integer_mv_flag of the current slice is equal to 1.

In one embodiment, TMVP (temporal motion vector predictor) is right shifted before it is used as MVP for the current block, when MVs of the current slice have the integer pixel resolution (i.e., use_integer_mv_flag=1). For example, if TMVP corresponds to (x, y), the operations (x+offx)>>2 and (y+offy)>>2 is performed before (x,y) is used as MVP when TMVP is applied. The "n>>2" operation corresponds to right-shifting n by "2", which is equivalent to "divide by 4". As is well-known in the field, the "shift by 2" operation can be implemented more efficient than the "divide by 4" operation. The parameters, offx and offy correspond to offsets in shift and they can be any integer, such as −3, −2, −1, 0, 1, 2, 3, etc. FIG. 3 illustrates an example of scaling the TMVP when use_integer_mv_flag of the current slice is equal to 1. In this scenario, use_integer_mv_flag in the current picture (310) is 1, use_integer_mv_flag in the collocated picture (320) is 0, and the collocated MV (324) for the reference block (322) is right-shifted by 2 and used as the TMVP for the current MV (314) of the current block (312).

Figure 4:
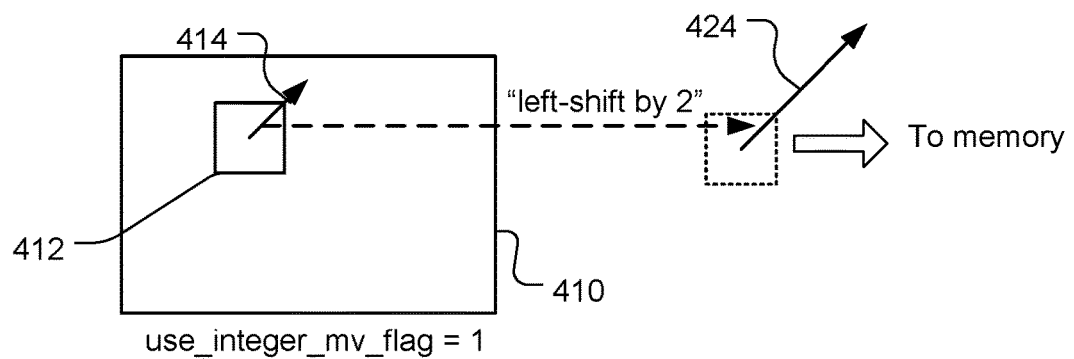
FIG. 4 illustrates an example of scaling MV before storing the MV when use_integer_mv_flag of the current slice is equal to 1.

In another embodiment, a decoded MV of the current slice is shifted left before it is stored when MVs of the current slice have the integer pixel resolution (i.e., use_integer_mv_flag=1). Decoded MVs of the current slice are stored for use as TMVP by subsequent pictures. For example, if a MV in block B of the current slice is decoded as (x,y), then (x<<2, y<<2) will be stored in the MV buffer for block B. And (x<<2, y<<2) will be treated as TMVP for a following picture if B is the collocated block. The operation "n<<2" corresponds to left-shifting n by 2. FIG. 4 illustrates an example of scaling MV before storing the MV when use_integer_mv_flag of the current slice is equal to 1. In this scenario, use_integer_mv_flag in the current picture (410) is 1, the current MV (414) of the current block (412) is left-shifted by 2 to generate a scaled MV (424) and the scaled MV (424) is stored in a memory. In one embodiment, the scaled MV stored in the memory can be used for subsequent pictures as TMVP. In another embodiment, the scaled MV stored in the memory is right-shifted before it is used as a motion vector predictor (i.e., the spatial motion vector predictor) for another block in the current picture containing the current slice. In yet another embodiment, the scaled MV stored in the memory can be used for the determination of boundary strength which is required for the deblocking process.

In the present application, when the integer motion vector resolution is enabled (i.e., use_integer_mv_flag is equal to 1), both block vector and motion vector are decoded at integer resolution. And both block vector and motion vector are stored at fractional-pel resolution (e.g., quarter-pel resolution). This is done by left shifting the decoded block vector or motion vector by N, in which N is a positive integer number (e.g., N=2). For example, the decoded motion vector or block vector will be left shifted by 2 to be at quarter-pel resolution, go through clipping process (so the resulted value is within certain value range, such as between−$2^{15}$ and $2^{15}$−1) and to be stored in quarter-pel resolution. However, the block vector predictor and motion vector predictor used are at integer resolution. This is done by right shifting the vector predictor by N (a positive integer number such as 2). On the other hand, when the integer motion vector resolution is disabled (i.e., use_integer_mv_flag is equal to 0), both block vector and motion vector are decoded at fractional-pel resolution. And both block vector and motion vector are stored at fractional-pel resolution (e.g., quarter-pel resolution) without any shifting operation. And the block vector predictor and motion vector predictor used are at fractional-pel resolution (e.g., quarter-pel resolution). For example, the decoded motion vector or block vector will go through clipping process (so the resulted value is within certain value range, such as between −$2^{15}$ and $2^{15}$−1) and to be stored in quarter-pel resolution. Because the clipping is done in the derivation of MV (or BV), there is no need to do the extra clipping operation prior to motion compensation (interpolation). Further, when a stored vector is used to predict an integer MV, the predictor should right shifted (e.g., by 2) to be in integer-pel resolution, before the predcition happens.

In one embodiment, when predFlagLX is equal to 1 and the picture with index refIdx from reference picture list LX of the slice is not the current picture, the luma motion vector mvLX is derived as follows:

$$uLX[0]=((((mvpLX[0]>>(2*use\_integer\_mv\_flag))+ mvdLX[0]<<(2*use\_integer\_mv\_flag))-2^{16}) \%2^{16}$$

$$mvLX[0]=(uLX[0]>=2^{15})?(uLX[0]-2^{16}): uLX[0]$$

$$uLX[1]=((((mvpLX[1]>>(2*use\_integer\_mv\_flag))+ mvdLX[1]<<(2*use\_integer\_mv\_flag))-2^{16}) \%2^{16}$$

$$mvLX[1]=(uLX[1]>=2^{15})?(uLX[1]-2^{16}):uLX[1].$$

In the above equations, mvpLX[0] and mvpLX[1] correspond to the motion vector components associated with the motion vector predictor, and mvdLX[0] and mvdLX[1] correspond to the motion vector differences between the current motion vector and the motion vector predictor in list LX, where X is equal to 0 or 1.

When the stored block vector or motion vector is used as a vector predictor in the block vector or motion vector prediction. If the slice that contains the to-be-predicted vector uses integer motion vector (the slice level flag "use_integer_mv_flag" is true or equal to 1), the vector predictor is right shifted by N (N is an integer number, such as 2) to make it at integer resolution, before prediction occurs. If the slice that contains the to-be-predicted vector uses fractional-pel motion vector (the slice level flag "use_integer_mv_flag" is false), the vector predictor is used directly without any shifting operation.

The stored block vector and motion vectors are used as inputs to interpolation filter and deblocking filter.

In an alternative solution, use_integer_mv_flag is stored so that it can be read by following pictures and used to determine whether to scale the decoded MV.

In yet another embodiment, TMVP is conducted differently depending on use_integer_mv_flag of the current slice and use_integer_mv_flag of the collocated picture.

For example, when MVs of the current slice have the integer pixel resolution and MVs of the collocated picture have the quarter pixel resolution, TMVP can be right shifted before it is used as MVP for the current block. If TMVP corresponds to (x, y), then ((x+offx)>>2, (y+offy)>>2) is used as MVP when TMVP is applied. Again, offx and offy are offsets in shift and they can be any value such as −3, −2, −1, 0, 1, 2, 3, etc.

In another example, TMVP can be left shifted before it is used as MVP for the current block, when MVs of the current slice have the quarter pixel resolution and MVs of the collocated picture have the integer pixel resolution. If TMVP corresponds to (x, y), then (x<<2, y<<2) should be used as MVP when TMVP is applied.

In one embodiment, MVs of the current slice and MVs of the collocated picture are forced to have the same resolution. In other words, use_integer_mv_flag of the current slice and use_integer_mv_flag of the collocated must be the same.

In another embodiment, TMVP is disabled if MVs of the current slice and MVs of the collocated picture have different resolutions. In other words, if use_integer_mv_flag of the current slice and use_integer_mv_flag of the collocated picture are different, TMVP is disabled for the current MV.

In still another embodiment, a reference picture will not be used as the collocated picture for the current slice if use_integer_mv_flag of the current slice and use_integer_mv_flag of the reference picture are different.

In still another embodiment, all slices in a sequence are forced to have the same MV pixel resolution. In other words, use_integer_mv_flag of all the slices in a sequence are the same.

In still another embodiment, use_integer_mv_flag is transmitted at a sequence level (e.g. in SPS) instead of the slice level. If use_integer_mv_flag in the sequence level has a value of 1, MV resolutions of all slices in the sequence are integer pixel. Otherwise, MV resolutions of all slices in the sequence are quarter pixel.

In one embodiment, MV is clipped after scaling based on MV pixel resolution. For example, motion vector values, MVL0 and MVL1 for list L0 and L1 respectively should be clipped to $[-2^{15}, 2^{15}-1]$ after being shifted left by 2. In other words, $MVL0=Max(-2^{15}, Min(MVL0<<2, 2^{15}-1))$ and $MVL1=Max(-2^{15}, Min(MVL1<<2, 2^{15}-1))$. Especially, this clip should be done for the MV scaling according to JCTVC-S1005 as shown in equation (1).

In another embodiment, the decoded MV can be constrained in different ranges depending on whether use_integer_mv_flag of the current slice is 0 or 1. The range should be tigher for use_integer_mv_flag=1 than the range for use_integer_mv_flag=0. For example, the range can be specified as:
  if use_integer_mv_flag is ==0, $-2^{15}<=mvL0$, $mvL1<=2^{15}-1$, and
  if use_integer_mv_flag is ==1, $-2^{13}<=mvL0$, $mvL1<=2^{13}-1$.

In the foregoing embodiments, the resolution of block vector and motion vector is unified when the current picture is used as one of the reference pictures. That is, the resolution of block vectors in a slice is the same as the resolution of regular motion vectors in the same slice.

As mentioned before, there is also an issue related to deblocking with related to MV resolution. In order to harmonize adaptive MV resolution and deblocking, several methods are disclosed as follows.

Figure 5:
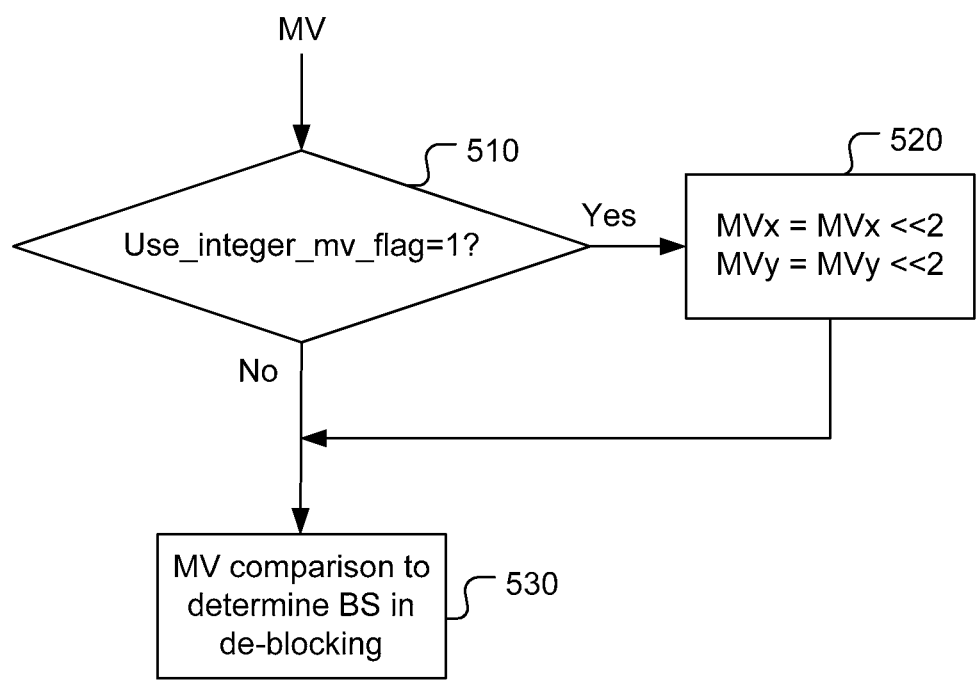
FIG. 5 illustrates an example that the MV uses the integer pixel resolution and the MV is left shifted by 2 before the MV is used for MV comparison in the deblocking process.

In one embodiment, deblocking are performed differently when different MV resolutions are used. For example, deblocking can be performed differently depending on use_integer_mv_flag. If the MV uses the integer pixel resolution (i.e., use_integer_mv_flag=1), the MV is left shifted by 2 (i.e., MVx=MVx<<2 and MVy=MVy<<2) before the MV is used for MV comparison in the deblocking process as shown in FIG. 5. In FIG. 5, the value of use_integer_mv_flag is checked in step 510 to determine whether integer MV resolution is used. If "use_integer_mv_flag=1" is true (i.e., the "yes" path from step 510), the MV is scaled in step 520 before the MV is used for MV comparison in the deblocking process in step 530. If "use_integer_mv_flag=1" is false (i.e., the "no" path from step 510), the MV is directly used for MV comparison in the deblocking process in step 530 without scaling.

In another embodiment, the absolute difference between the horizontal or vertical component of the motion vectors is compared with a threshold value of 1 instead of 4 when MVs use the integer pixel resolution (i.e., use_integer_mv_flag=1).

If the MV uses the half pixel resolution, the MV is left shifted by 1 (i.e., MVx=MVx<<1 and MVy=MVy<<1) before it is used for MV comparison in the deblocking process according to one embodiment.

If the MV uses the eighth pixel resolution, the MV is right shifted by 1 (i.e., MVx=MVx>>1 and MVy=MVy>>1, or MVx=(MVx+1)>>1 and MVy=(MVy+1)>>1) before it is used for MV comparison in the deblocking process.

If MVs use the half pixel resolution, the absolute difference between the horizontal or vertical component of the motion vectors is compared with a threshold value of 2 instead of 4.

If MVs use the eighth pixel resolution, the absolute difference between the horizontal or vertical component of the motion vectors is compared with a threshold value of 8 instead of 4.

In still another embodiment, deblocking is not conducted when integer pixel resolution is used (i.e., use_integer_mv_flag=1).

In the above embodiments, the temporal motion vector prediction has been used as an example for applying MVP coding to the current MV or storing the current MV depending on the current MV resolution, the reference MV resolution, or both the current MV resolution and the reference MV resolution. The present invention may also be applied to other types of MVP such as spatial MVP or inter-view MVP.

As mentioned before, the color-space transform may also cause an issue for a decoder system when the color-space transform is applied. According to a conventional decoder implementation, the received QP (quantization parameter) is adjusted by subtracting 5 or 3 from the original QP. Accordingly, the adjusted QP may become negative. In order to guarantee that the QP is always in a valid range when adaptive color-space transform is applied, several methods are disclosed for QP adjustment.

In one embodiment, QP after adjustment is always no smaller than 0 according one of the following operations:

$$qP=\text{Max}(0,Qp'Y+(cu\_residual\_act\_flag[xTbY][yTbY]?-5:0)) \quad (8)$$

$$qP=\text{Max}(0,Qp'Cb+(cu\_residual\_act\_flag[xTbY][yTbY]?-5:0)) \quad (9)$$

$$qP=\text{Max}(0,Qp'Cr+(cu\_residual\_act\_flag[xTbY][yTbY]?-3:0)). \quad (10)$$

Max( ) corresponds to a maximum function in the above equations. In another embodiment, adjusted QP is clipped to a valid range after QP is adjusted to accommodate signal range reduction due to color-space transform. For example, the above equations can be rewritten as follows:

$$qP=\text{clip3}(\text{MinQPY},\text{MaxQPY}, Qp'Y+(cu\_residual\_act\_flag[xTbY][yTbY]?-5:0)) \quad (11)$$

$$qP=\text{clip3}(\text{MinQPCb},\text{MaxQPCb}, Qp'Cb+(cu\_residual\_act\_flag[xTbY][yTbY]?-5:0)) \quad (12)$$

$$qP=\text{clip3}(\text{MinQPCr},\text{MaxQPCr}, Qp'Cr+(cu\_residual\_act\_flag[xTbY][yTbY]?-3:0)). \quad (13)$$

In the above equations, clip (a, b, x) is a clipping function that clips the variable x to a range from a to b. MinQPY, MinQPCb and MinQPCr correspond to the minimum clipping values for Y, Cr and Cr respectively. MaxQPY, MaxQPCb and MaxQPCr correspond to the maximum clipping values for Y, Cr and Cr respectively. For example, MinQPY can be set to be 0 and MaxQPY can be set to be 51; MinQPCb can be set to be 0 and MaxQPCb can be set to be 51; and MinQPCr can be set to be 0 and MaxQPCr can be set to be 51.

In another example, MinQPCb and/or MaxQPCb can be set according to MinQPY and/or MaxQPY respectively. Similarly, MinQPCr and/or MaxQPCr can be set according to MinQPY and/or MaxQPY respectively.

In still another embodiment, QP is calculated within a valid range according to a function if adaptive color-space transform is used. For example, equations (4), (5) and (6) can be rewritten as:

$$qP=(cu\_residual\_act\_flag[xTbY][yTbY]?fY(Qp'Y):Qp'Y), \quad (14)$$

$$qP=(cu\_residual\_act\_flag[xTbY][yTbY]?fCb(Qp'Cb):Qp'Cb), \quad (15)$$

$$qP=(cu\_residual\_act\_flag[xTbY][yTbY]?fCr(Qp'Cr):Qp'Cr). \quad (16)$$

The return value of fY( ), fCb( ), and fCr( ) is larger than or equal to 0. For example, function fY(Qp'Y) may correspond to (Qp'Y−5+OffsetY1+OffsetY2)% OffsetY1. Function, fCb(Qp'Cb) may correspond to (Qp'Cb−5+OffsetCb1+OffsetCb2)% OffsetCb1. Similarly, function fCr(Qp'Cr) may correspond to (Qp'Cr−3+OffsetCr1+OffsetCr2)% OffsetCr1. For example, OffsetY1, OffsetCb1 and OffsetCr1 can be all set to 51.

In still another embodiment, a constraint can be applied in the encoder side so that the adjusted QP will not be lower than 0. If equations (1), (2) and (3) incur one or more qP<0, the bit-stream is considered as illegal. In another embodiment, the adaptive color-space transform should be turned off if equations (1), (2) and (3) incur one or more qP<0.

Figure 6:
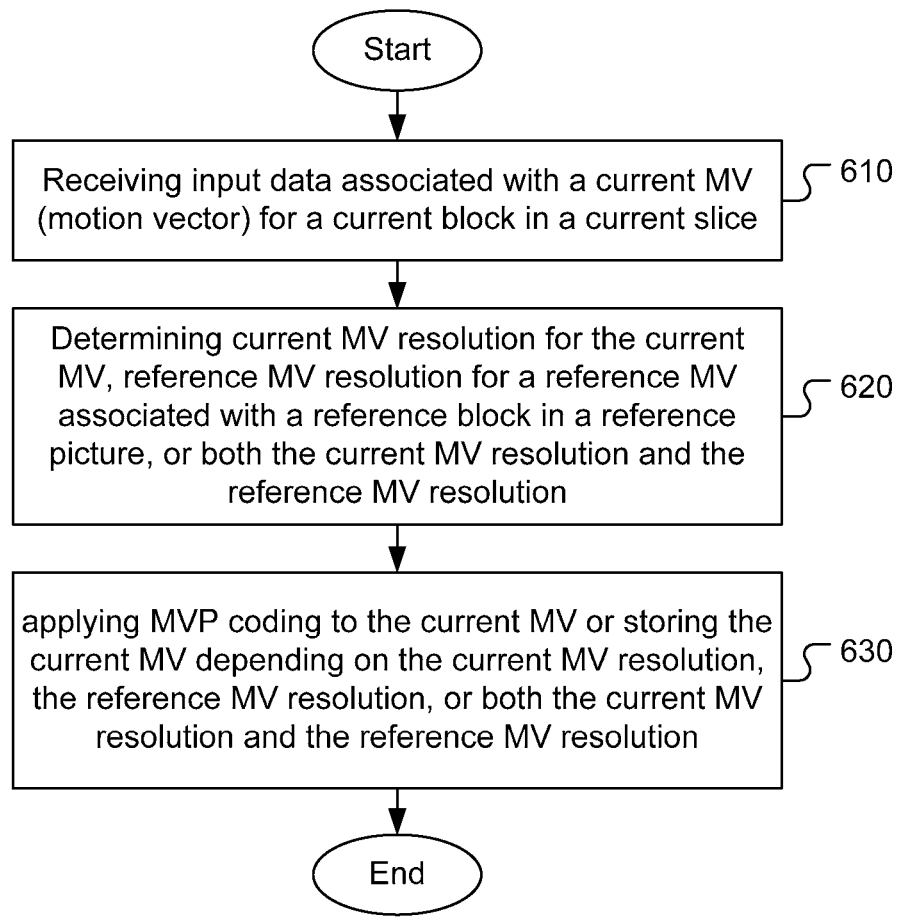
FIG. 6 illustrates an exemplary flowchart of MVP (motion vector prediction) for video data incorporating an embodiment of the present invention.

FIG. 6 illustrates an exemplary flowchart of MVP (motion vector prediction) for video data incorporating an embodiment of the present invention. The system receives input data associated with a current MV (motion vector) for a current block in a current slice in step 610. The input data may be retrieved from storage such as a computer memory of buffer (RAM or DRAM). The input data may also be received from a processor such as a processing unit or a digital signal. At the encoder side, the input data may correspond to the current MV to be predicted. At the decoder side, the input data may correspond to coded MV data to be decoded. The current MV resolution for the current MV, reference MV resolution for a reference MV associated with a reference block in a reference picture, or both the current MV resolution and the reference MV resolution are determined in step 620. MVP coding is then applied to the current MV or the current MV is stored depending on the current MV resolution, the reference MV resolution, or both the current MV resolution and the reference MV resolution in step 630.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of MVP (motion vector prediction) for video data, the method comprising:
receiving input data associated with a current MV (motion vector) for a current block in a current slice;
determining current MV resolution for the current MV, reference MV resolution for a reference MV associated with a reference block in a reference picture, or both the current MV resolution and the reference MV resolution; and
applying MVP coding to the current MV or storing the current MV depending on the current MV resolution, the reference MV resolution, or both the current MV resolution and the reference MV resolution, wherein when the reference MV associated with the reference block in the reference picture corresponds to a temporal MV associated with a temporal reference block in the reference picture and the current MV resolution corresponds to integer pixel resolution, said applying MVP coding to the current MV uses a modified temporal MV as a motion vector predictor for the current MV, wherein the modified temporal MV is generated by right-shifting the temporal MV, wherein when a shift operation is applied to the current MV or the temporal MV due to the current MV resolution or the reference MV resolution respectively, the current MV shifted or the temporal MV shifted after applying MVP coding is constrained to a valid range.

2. The method of claim 1, wherein when the current MV resolution corresponds to integer pixel resolution, the current MV is left-shifted before it is stored in a memory.

3. The method of claim 1, wherein the current MV stored in a memory is right-shifted before it is used as a motion vector predictor for another block in a current picture containing the current slice.

4. The method of claim 1, wherein when the current MV resolution corresponds to integer pixel resolution, the current MV is left-shifted before it is used in determination of boundary strength used for a deblocking process.

5. The method of claim 1, wherein when the current MV resolution corresponds to non-integer pixel resolution and the reference MV resolution corresponds to integer pixel resolution, said applying MVP coding to the current MV uses a modified temporal MV as a motion vector predictor for the current MV, wherein the modified temporal MV is generated by left-shifting the temporal MV.

6. The method of claim 1, wherein when the current MV resolution is different from the reference MV resolution, said applying MVP coding to the current MV disables the MVP coding for the current block.

7. The method of claim 1, wherein when the current MV resolution is different from the reference MV resolution, said applying MVP coding to the current MV disregards the reference picture for the MVP coding of the current block.

8. The method of claim 1, wherein the current MV has different ranges for different current MV resolutions or the temporal MV has different ranges for different reference MV resolutions.

9. The method of claim 1, wherein the current MV resolution is indicated by a MV resolution flag in a slice header and all blocks within a corresponding slice share the MV resolution flag.

10. The method of claim 1, wherein the current MV resolution is indicated by a MV resolution flag in a sequence level and all blocks within a corresponding sequence share the MV resolution flag.

11. An apparatus of MVP (motion vector prediction) for video data, comprising one or more electronic circuits arranged to:
receive input data associated with a current MV (motion vector) for a current block in a current slice;
determine current MV resolution for the current MV, reference MV resolution for a reference MV associated with a reference block in a reference picture, or both the current MV resolution and the reference MV resolution; and
apply MVP coding to the current MV or store the current MV depending on the current MV resolution, the reference MV resolution, or both the current MV resolution and the reference MV resolution, wherein when the reference MV associated with the reference block in the reference picture corresponds to a temporal MV associated with a temporal reference block in the reference picture and the current MV resolution corresponds to integer pixel resolution, said applying MVP coding to the current MV uses a modified temporal MV as a motion vector predictor for the current MV, wherein the modified temporal MV is generated by right-shifting the temporal MV, wherein when a shift operation is applied to the current MV or the temporal MV due to the current MV resolution or the reference MV resolution respectively, the current MV shifted or the temporal MV shifted after applying MVP coding is constrained to a valid range.

* * * * *